United States Patent

[11] 3,624,726

[72] Inventors William H. Horton;
Chester W. Michatek, both of Rochester, N.Y.
[21] Appl. No. 850,701
[22] Filed Aug. 14, 1969
[45] Patented Nov. 30, 1971
[73] Assignee Eastman Kodak Company
Rochester, N.Y.

[54] FLASH-FIRING AND SENSING MECHANISM FOR CAMERA OR ATTACHMENT ADAPTED TO USE PERCUSSIVELY FIREABLE FLASHLAMPS
27 Claims, 6 Drawing Figs.

[52] U.S. Cl. .................................................. 95/11, 95/11.5 R
[51] Int. Cl. .................................................. G03b 19/00
[50] Field of Search .......................................... 95/11, 11.5, 11 L; 240/1.3

[56] References Cited
UNITED STATES PATENTS

| | | | |
|---|---|---|---|
| 3,463,067 | 8/1969 | Fauth et al. | 95/11 |
| 590,204 | 9/1897 | Blackmore | 95/11.5 |
| 3,259,043 | 7/1966 | Pagel | 95/11 X |
| 3,353,467 | 12/1967 | Ernisse et al. | 240/1.3 X |
| 3,383,995 | 5/1968 | Bresson | 240/37.1 X |
| 3,391,621 | 7/1968 | Nerwin | 95/11 |
| 3,406,619 | 10/1968 | Rentschler | 95/11 X |
| 3,473,454 | 10/1969 | Stutz et al. | 95/11 |
| 3,528,353 | 9/1970 | Colville | 95/11 |

Primary Examiner—John M. Horan
Assistant Examiner—Thomas A. Mauro
Attorneys—Robert W. Hampton and J. Addison Mathews ABSTRACT: A camera or attachment, adapted to receive and fire percussively ignitable flashlamps, is provided with a pivotal sensing and actuating arm that mechanically senses the operative or inoperative condition of the flashlamp as soon and as long as the flashlamp is received on the camera. The arm is particularly adapted for use with flashcubes supporting a plurality of percussively ignitable flashlamps, each having a pre-energized striker wire, and is adapted to move into the cube to mechanically sense the operative or inoperative position of the striker wire and to position a warning signal such as a flag or other member in one of two positions indicative of such sensed striker position. To permit rotation of the cube, the arm includes a cam surface adapted to cooperate with the cube for temporarily camming the arm out of the cube upon cube rotation. The arm further has operative and inoperative positions, and mechanisms are provided for holding the arm in the inoperative position except when a flashlamp is positioned on the camera and for setting an exposure aperture for proper flash exposure when a flashlamp is positioned on the camera.

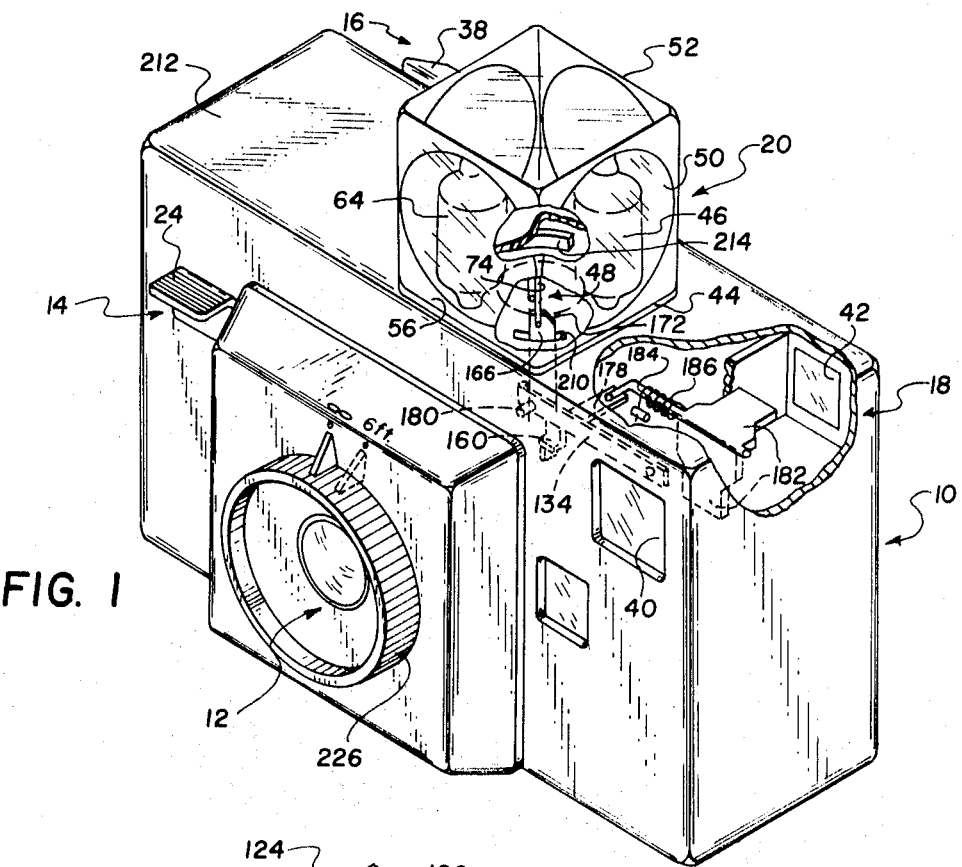
FIG. 1
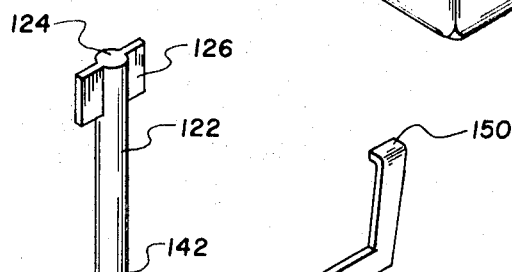
FIG. 6
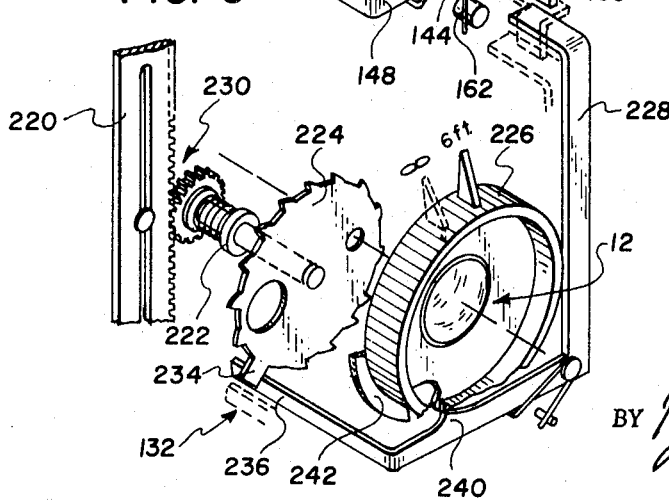
WILLIAM H. HORTON
CHESTER W. MICHATEK
INVENTORS
ATTORNEYS

PATENTED NOV 30 1971 3,624,726

WILLIAM H. HORTON
CHESTER W. MICHATEK
INVENTORS

BY *J. Adding mathews*
*R. W. Hampton*

ATTORNEYS

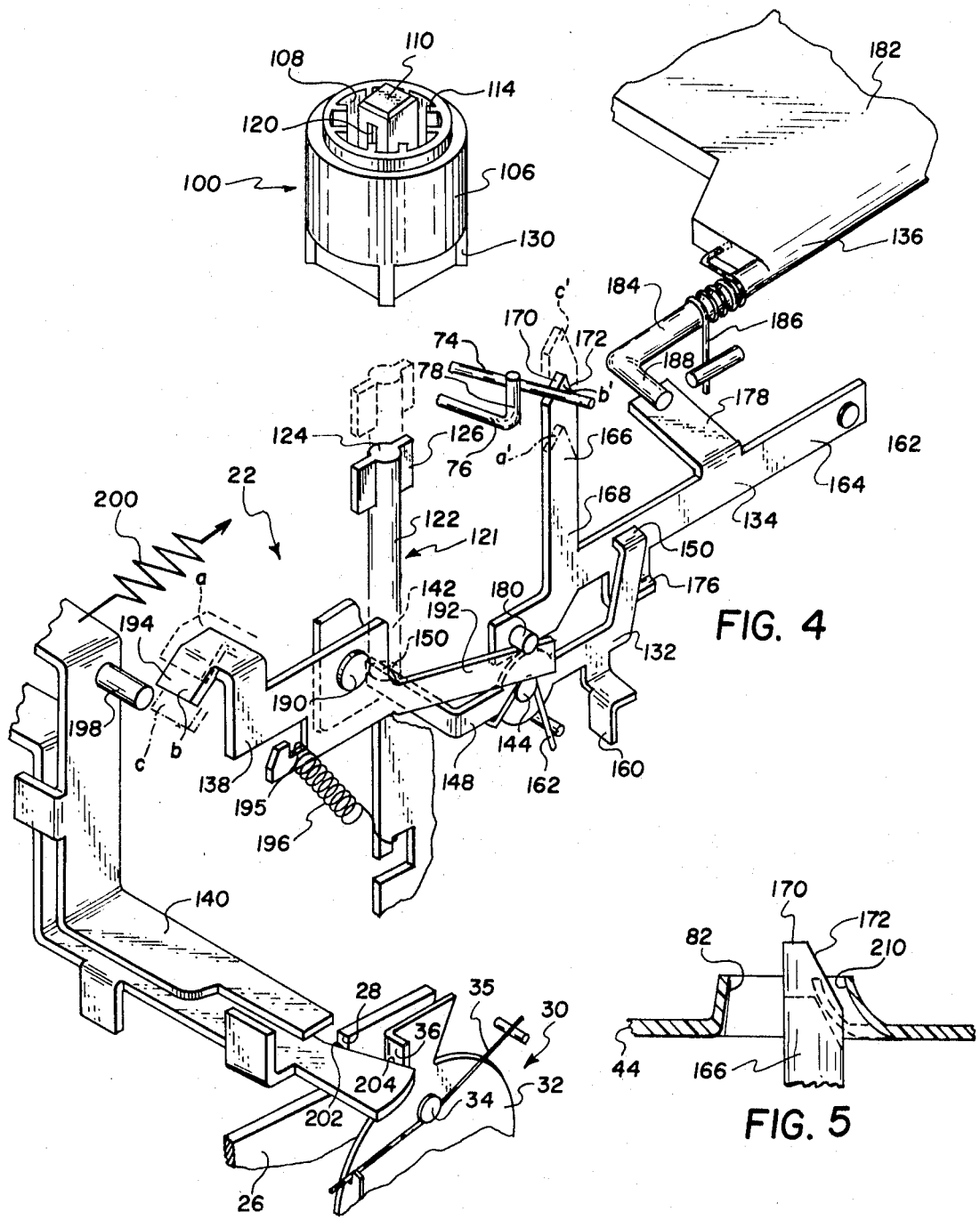

FLASH-FIRING AND SENSING MECHANISM FOR CAMERA OR ATTACHMENT ADAPTED TO USE PERCUSSIVELY FIREABLE FLASHLAMPS

BACKGROUND OF THE INVENTION

The present invention relates to flash photography and more specifically to means for firing and for sensing the condition of a percussively ignitable flashlamp.

It is well known in the photographic art to provide flash cameras with electrical means for firing a flashlamp and for sensing the operative or inoperative condition of the flashlamp.

More recently, and in order to obviate the necessity for providing an electrical source and circuit in photoflash apparatus, a percussively ignitable photoflashlamp has been developed. Corresponding in some respects to cameras useable with electrically fireable flashlamps, cameras adapted to receive the percussively ignitable lamps also have been provided with mechanical means for firing the lamp and for sensing the operative or inoperative condition of the lamp. Such mechanical mechanisms are disclosed, for example, in commonly assigned, copending U.S. Pat. applications Ser. No. 766,751, entitled Percussion-ignitable Flash Unit Having Contact-Actuatable, Preenergized Strikers and Photographic Apparatus Using Such Units, filed on Oct. 11, 1968 in the name of Poweska et al.; and Ser. No. 767,145, entitled Control and Signal-Actuating Mechanism For Use With Photoflashlamp Units Having Preenergized Strikers, filed on Oct. 14, 1968 in the name of E. L. Sturm. In the Poweska et al. application, an actuating member, normally held in an energized position displaced from the flashlamp, is released upon shutter actuation and rapidly moves into engagement with the preenergized striker to dislodge the striker and fire the flashlamp. In the Sturm application, partial actuation of the camera body release or shutter-actuating mechanism moves a sensing probe into contact with a preenergized striker in the flashlamp to sense the operative or inoperative condition of the flashlamp. If the flashlamp is inoperative, the sensing probe will move to an overextended position and such movement effects positioning of a signal in the camera viewfinder and locking of the body release to prevent picture taking.

Such previously known electrical and mechanical means for firing and sensing the condition of a flashlamp on the camera have been generally satisfactory for their intended purpose, but have suffered from certain disadvantages. For example, and referring first to sensing mechanisms, presently known devices generally require actuation or partial actuation of some camera mechanism before sensing and signaling of the operative or inoperative condition of a flashlamp is effected. In the aforementioned U.S. application Ser. No. 767,145, this sensing and signaling operation is initiated by depression of the camera body release or shutter-actuating member. Such a mechanism is not only inconvenient but also may lead to the inadvertent actuation of the shutter before the camera operator recognizes the signal indicative of an inoperative flashlamp.

Particular problems have been encountered with electrical sensing devices. Even aside from the inconvenience associated with the necessary batteries (such as their bulk in the camera, their variable voltage characteristics, and their irrepressible tendency to wear out at the worst possible moment), electrical systems continue to deplete the electrical source as long as they remain in an energized condition. Unless they are energized only for brief periods of picture taking, an excessive draining of the power supply will result. Thus, it has not been possible in previously known electrical sensing devices to provide satisfactory means for presenting a signal of an inoperative flashlamp whenever and as long as the lamp is positioned on the camera.

Of course, the electrical circuit would be provided with a switching means which is energized only when an inoperative flashlamp is positioned on the camera. Such a system is illustrated, for example, in the FIG. 5 of commonly assigned copending U.S. application Ser. No. 767,102, entitled Indicator of Use In Photographic Apparatus to Automatically Sense a Flashlamp Condition, filed on Oct. 14, 1968 in the name of D. M. Harvey. However, this is only a partial solution since flash devices often are left on cameras for extended periods of time, and, if the flashlamp in the firing position is inoperative, the energy source will be depleted during the entire period the inoperative flashlamp is on the camera. Moreover, in a disturbing number of cases electrical systems have been known to fail because of poor electrical contacts and, unless the electrical energy for sensing is accurately calibrated to relatively close tolerances, the electrical sensing signal may prematurely fire the flashlamp.

By way of further background, various problems encountered in designing mechanical sensing systems also should be noted since these problems prevented previous development of a satisfactory system for continuously sensing the condition of any flashlamp at a firing location. For example, more recent flashlamps are contained in multilamp units or cubes rotatable relative to the camera for indexing respective ones of the flashlamps to a firing locus. Thus, the sensing means should not unduly interfere with such rotation. This has been a particularly difficult problem because, as disclosed herein, it has been found desirable to mechanically engage the flashlamp with a sensing and/or actuating member normally extending into engagement with the flashlamp both immediately before and after rotation of the cube.

Moreover, the sensing means should not interfere with the lamp-firing mechanism, even though such means preferably remains in its sensing position at least until immediately prior to firing, and even though the member sensed has a relatively small accessible area that also has to be engaged by the firing mechanism. By way of a still further example, a satisfactory sensing means has to be inaccessible to damage when no flash is positioned on the camera. Again, and as described above, it has been found desirable to provide a sensing member that normally extends above the camera-casing to engage the flashlamp, and when the flashlamp is removed, the sensing member is particularly subject to damage unless protected.

Referring now to mechanisms for firing percussive flashlamps and especially to flashlamps having preenergized strikers, previous camera mechanisms, as disclosed for example in aforementioned U.S. application Ser. No. 766,751, have utilized an actuating member rapidly movable from a first position, wherein the member is spaced from the lamp striker, to a second position, wherein the member engages and dislodges the striker. Such actuating member previously were considered necessary, for example, so the actuating member normally would be withdrawn from the flashlamp and therefore would not interfere with successive indexing of flashlamps. However, more recently it has been found that the relatively long actuating stroke of such previous members makes it difficult to control the force with which the actuating member impacts and dislodges the striker in the cube. Moreover, the rapid movement of the actuating member must be accurately controlled to assure that the member will enter the relatively small opening in the cube base, and the cube must be securely secured to the camera to prevent unlatching therefrom or even undesirable movement thereof due to the relatively large impacting force required from such previously known actuating means.

Aforementioned Sturm U.S. application Ser. No. 767,145 discloses a partial solution to these last-mentioned problems by first moving the camera-mounted actuating member into nonreleasing engagement with the flashlamp striker wire. Thereafter, the actuating member is struck or impacted to effect dislodging of the wire and firing of the flashlamp. Since such actuating movement is very rapid, begins from a position already engaging the wire, and has a very short stroke, it is extremely accurate and reliable. However, its reliance for operation on the camera body release presents problems under certain operating conditions, as described above in connection with the sensing function of the member. Moreover, it requires a body release capable of substantial movement to accomplish both initial setting and later firing of the actuating member, and this in itself is undesirable at least in many cameras where such substantial movement is not available.

Problems such as these and others are apparent, for example, from various previously filed applications disclosing means for correcting the problematical effects resulting from known actuating members. However, none of these previously attempted solutions have recognized or been directed to the very cause of the problem in the actuating member.

SUMMARY OF THE INVENTION

It is, therefore, an object of the present invention to overcome the above-noted problems encountered with previously known mechanisms and to provide an improved sensing and/or actuating mechanism which is simple but reliable in operation.

It is a further object of the present invention to provide such a mechanism which is operative immediately upon positioning of the flashlamp at the firing position to effect a signal or other indication indicative of the operative or inoperative condition of such a flashlamp. Moreover, to more fully accomplish this object, the signal or other indication can be effected even prior to depression or actuation of the body release or any other camera mechanism.

It is further an object of the present invention to provide a mechanism of the aforementioned type which is adapted to sense the condition of a flashlamp supported in a unit containing a plurality of such lamps, and to provide means for withdrawing the sensing member to permit indexing of the flashlamps without substantial interference to such indexing.

It is still a further object of the present invention to provide an actuating and/or sensing member that has an inoperative or retracted position when no flashlamp is received on the camera, and that is moved automatically in response to positioning of a flash on the camera to a position normally in contact with a preenergized percussive-firing member in the flash.

In accordance with a preferred embodiment of the invention, a camera or attachment is provided with a mechanism for sensing and/or firing a percussively ignitable flashlamp device having a preenergized percussive striker and received in a multilamp unit containing a plurality of such devices. The mechanism includes an arm that mechanically senses the operative or inoperative condition of a flashlamp without depending for its operation on actuation of other camera mechanisms such as the body release or shutter-actuating member. Therefore, the arm can sense the flashlamp condition as soon and as long as the flashlamp is positioned at a firing locus. The arm has a first or retracted position when no flash is positioned on the camera and is movable into contact with the preenergized striker automatically in response to positioning of a flash at the camera-firing locus. If the flashlamp at the firing locus is inoperative, for example because the preenergized striker already has been released to fire the lamp, the arm will not engage the striker but will move to an overextended position to effect or set a signal or other means to a position or condition indicative of the inoperative lamp. In addition to its sensing function, the arm comprises an actuating means for dislodging the striker wire to fire the flash and, also in connection with this latter function, the arm is positioned in engagement with the striker prior to firing. To permit indexing of the flash device without substantial interference from the arm, means are provided for temporarily camming the arm out of engagement with the device upon indexing of the device.

BRIEF DESCRIPTION OF DRAWINGS

Referring now to the drawings:

FIG. 1 is a perspective view of a percussively ignitable flashcube received on a camera with parts of the camera broken away to illustrate various features of the present invention;

FIG. 4 is a schematic view of a cube-sensing and actuating mechanism in accordance with the present invention;

FIG. 5 is a partial cross-sectional view of a flashcube and a portion of the actuating and sensing mechanism of FIG. 4, illustrating the manner in which the sensing member is cammed to a retracted position upon cube rotation; and FIG. 6 is a schematic view of a mechanism responsive to the actuating and sensing mechanism of FIG. 4, for automatically adjusting or setting the camera diaphragm for proper exposure when a flash is positioned on the camera.

DESCRIPTION OF THE PREFERRED EMBODIMENT

Figure 2:
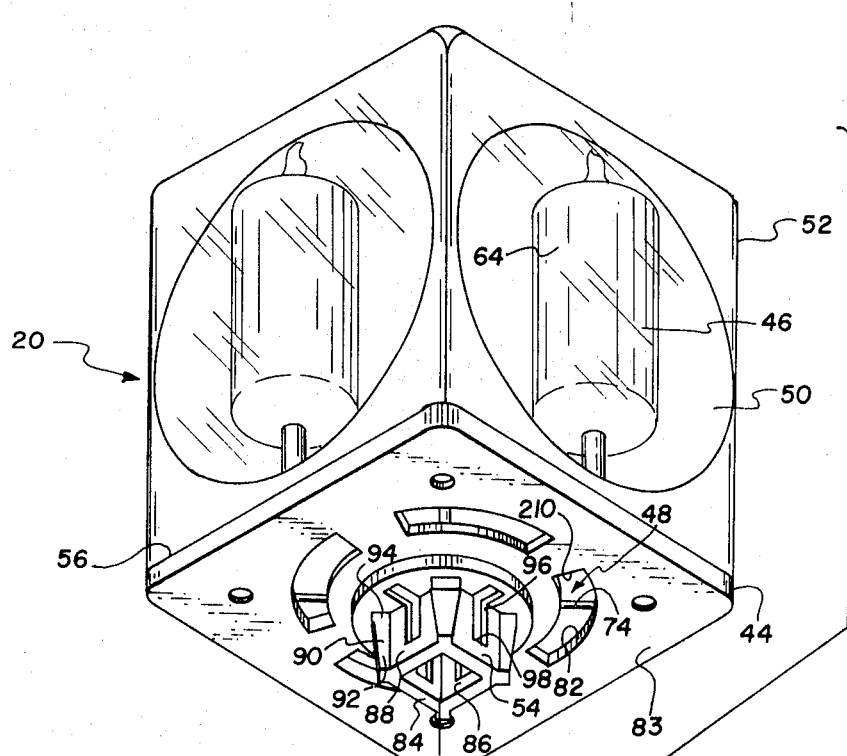
FIG. 2 is an exploded perspective view of a percussive flashcube and flashcube socket usable with the present invention.

Referring again to the drawings, and particularly to FIG. 1, a camera for incorporating a preferred embodiment of the invention is illustrated, generally comprising a camera casing 10 supporting an objective 12, a shutter-actuating means depicted as a body release or depression member 14, a film-advancing means or winding member 16 and a viewfinder 18. As will be described more fully hereinafter the camera is particularly adapted to receive a percussively ignitable flashcube 20 which is fireable synchronously with operation of the camera shutter by a mechanism 22 illustrated on FIG. 4.

GENERAL CAMERA FEATURES

Body release or depression member 14 is most clearly illustrated in FIGS. 1 and 4 and, in the preferred embodiment, comprises a portion accessible from the camera exterior, such as depression surface 24 (FIG. 1), and an elongated or body portion 26 (FIG. 4) including a shutter stop or latching surface 28. The portion 26 is mounted within the camera-casing for movement, in response to depression of body release 14, between a first or latching position, and a second or releasing position for effecting actuation of the shutter and possibly also various other camera mechanisms as will be described more fully hereinafter.

A portion 30 representative of the shutter or aperture-closing means is illustrated most clearly in FIG. 4, and preferably is of the single-blade type actuatable by an impacting or striking member. The shutter includes a blade 32 mounted in the camera for pivotal movement about a stud 34, or other suitable means, and is normally maintained in a closed position by resilient means such as a hairpin spring (35). A first portion of blade 32, on one side of the pivot point or stud 34, is adapted to cover the camera aperture when the shutter is in its closed position, while a second portion of the blade, on the other side of pivot 34, is provided with a striking surface or abutment 36 adapted to be struck or impacted by a shutter operating member as will be described more fully hereinafter. Such striking or impacting member drives the shutter blade in clockwise direction, against the resilient means or spring, to open the shutter and expose film in the camera for a proper exposure period, after which the resilient means returns the blade to the closed position.

Winding mechanism 16, is more clearly disclosed in commonly assigned copending U.S. application Ser. No. , entitled Firing Mechanism For Percussively Ignitable Flashlamps, and filed concurrently herewith in the name of Edward Sturm. Briefly, however, the winding mechanism preferably comprises a handle or actuating member 38 engageable from the camera exterior and adapted to be coupled or connected to a film takeup spool for advancing or winding film in the usual manner. Within the camera the winding mechanism includes means (not shown) for setting or indexing various camera-operating mechanisms, such as the shutter driver and flashcube, in response to winding of the film, as described more fully in the aforementioned U.S. application.

Viewfinder 18 is of a type well known to those skilled in the art and comprises a front window or objective 40, and a back window or eyepiece 42. For purposes to become more apparent hereinafter, sufficient space is provided between the front and back windows 40 and 42 for receiving a signal means such as a translucent warning flag.

THE MULTILAMP UNIT AND COOPERATING SOCKET

Figure 3:
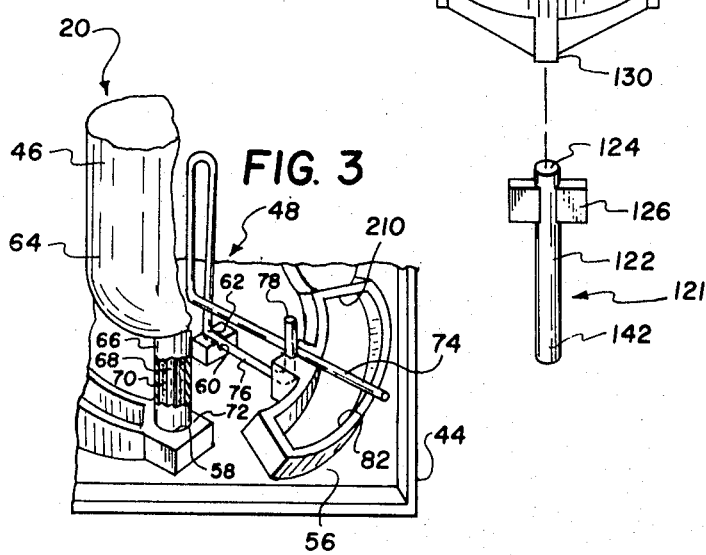
FIG. 3 is a partial view of a percussive flashcube with parts broken away to illustrate the preenergized striker of a flashcube usable with the present invention.

Referring now to FIGS. 2 and 3, and to details of a preferred flash device or multilamp flash unit particularly adapted for use with the present invention, a flashcube 20 is illustrated comprising a base 44 for supporting percussively ignitable flashlamps 46, a striker member or wire 48 associated with each flashlamp, reflecting means such as polished metal foil formed behind each flashlamp into concaved disks 50, a cover member of light transparent material 52, and supporting or indexing means such as post 54. In many respects, structural features of cube 20, such as the reflecting means and cover member, are somewhat similar to the presently commercial electrical cube and will not be described in detail here. However, and while the cube per se is not a part of the present invention, a description of certain of the cube features follows for a better understanding of the present invention.

Each of the flashlamps 46 and corresponding striker wires 43 is securely supported on one side of the base 56, normally referred to as the upper face thereof, by means illustrated most clearly in FIG. 3 and comprising means defining a circular hole or bore 58 for receiving and supporting a portion of the flashlamp, and cut out portions or slots 60 for receiving and supporting a portion such as knee 62 of the striker wire. The upper face of base 44 also may be provided with a stop peg or lodging means for maintaining or lodging the striker wire 48 in its preenergized condition. However, in the embodiment illustrated, the function of this lodging member is provided by a bent portion of the striker wire itself, as will be described more fully hereinafter.

Each of the four flashlamps 46 comprises a hermetically sealed envelope 64 containing combustible material, such as a zerconium foil, in a combustion-supporting atmosphere such as oxygen. The base or lower portion of envelope 64 is formed or sealed around an elongated tube 66 of readily deformable material, having a substantially circular cross section and surrounding or containing in spaced relation therein an anvil or blockup member 68. Combustion of the combustible material in the envelope is accomplished by rapidly deforming the tube with a percussive or impacting force to effect ignition of a percussively ignitable primer material 70, such as a fulminate coated on the anvil or located in the space between tube 66 and anvil 68. Upon such ignition the resulting heat energy deflagrates and is directed upwardly through the tube 66 and into envelope 64 to initiate combustion of the zerconium foil or other combustible material in the envelope to fire the flashlamp. The lower or end portion 72 of tube 66 also serves to support the envelope on the cube base and, for this purpose, is configured to cooperate with the circular hole or bore 58 in the base 44 for securely supporting the flashlamp on the base.

The preferred lamp-impacting member or striker wire 48 also is shown most clearly in FIG. 3, and comprises an elongated or striking leg 74, an upwardly bent central portion adapted to be torsionally bent or tensioned to energize the striking leg, a knee 62 defined by the central portion for engaging the cube base to locate the striking wire on the base, and a second elongated or supporting leg 76 including a bent end portion defining a stop pin or lodging element 78 for maintaining or lodging the striking leg in the tensioned position. During manufacture of the cube the striker wire is positioned in a preenergized or pretensioned position in which it is maintained by lodging element 78 until the cube is fired.

To permit actuation or dislodging of this striker for percussively firing the lamp, an opening or cutout portion 82 is provided in the base below the energized striking leg. This opening is configured to receive a camera-actuating and/or sensing member adapted to engage the wire to first sense the operative or inoperative position of the wire and thereafter to rapidly push the striking leg upwardly over lodging element 78 to dislodge the striking leg. Upon such dislodging the striking leg will be rapidly moved into engagement with tube 66, by the torsional force stored in the central portion of the striker wire, and will deform the tube and fire the lamp as described hereinabove.

The supporting or indexing means 54 extends outwardly or downwardly from the other or lower face 83 of base 44 and may be separately attached or integrally molded thereto. This means 54 comprises a channel member 84 defining a square interior opening 86 and a substantially square external surface 88. At each of the four corners of the external surface, locating means are provided comprising ribs or splines 90 each having a tapered lowered portion 92 and a substantially square upper portion 94. As will be described more fully hereinafter in connection with a camera socket for receiving the cube, the splines 90 are guided into the socket in part by the tapered portions, until they are fully seated therein, and then are held or maintained securely in their proper position relative to the socket mainly by the upper square portion 94. Also provided on the flat sides of external surface 88 and between the splines 90 are recesses or slot portions 96 having a slightly tapered or inclined lower surface 98 for cooperating with the socket latching means also to be described more fully hereinafter.

In summary, the flashcube described above supports a plurality of flashlamps and preenergized or pretensioned strikers, one associated with each flashlamp. In order to fire one of the lamps, an actuating member, for example on a camera or attachment, is moved through an opening in the base and into the cube to engage and dislodge the preenergized striker from its preenergized position. The striker will then rapidly strike the tube or base of the flashlamp to percussively ignite the primer which, in turn, will deflagrate into the envelope to ignite the combustible material and fire the lamp. In the first and energized or operative position the striker wire is located over the opening in the cube base. In the second and released or inoperative position, on the other hand, the striker wire remains in contact with the lamp base or tube and is spaced from the base opening.

Referring now to FIG. 2, a preferred flashcube socket is illustrated for use with the present invention and comprises a cylindrical member 100 having a base 102 and sidewalls 104 defining socket exterior surfaces 106 and interior surfaces 108.

Extending upwardly away from the base 102, and within walls 104, are a square aligning post or member 110, adapted to cooperate with the internal surfaces 86 of the cube channel member 54, and a plurality of flexible fingers 112, adapted to cooperate with the latching surfaces 98 on the flat portion 88 of channel member 54. Also extending in substantially the same direction as post 110 are means such as ribs 114 defining a plurality of channels or slots adapted to cooperate with the cube splines 90 to accurately and securely maintain the cube in a predetermined position in the socket. These ribs 114 may be thin-walled and flexible to compensate for molding or manufacturing tolerances resulting, for example, in channels or slots which are not located exactly at 90° from each other. Moreover, if desired, the channel ribs 90 purposefully can be designed for a force fit with the cube splines so the ribs will flex outwardly to pinch the splines and even more securely hold and locate the cube in the socket.

Upon inserting a flashcube into the socket, the aligning post 110 in the socket engages the interior 86 of cube channel member 54 to initially align the cube relative to the socket and insure that the cube is oriented in a proper angular relationship with the socket. Similarly, the lower or tapered portions of cube ribs 90 engage and initially orient the cube in splines 114. As the cube further is pushed to its final position in the socket, the central socket post 110 engages interior portions of the cube channel member 50 to prevent tilting of the cube relative to the socket, and the upper or square portions of ribs 90 engaged and closely cooperate with the internal surfaces of socket 114 to accurately and securely orient the cube. Also during the final stages of cube positioning, the socket-latching fingers 112 engage the cube-latching surfaces 98 to securely but releasably hold or maintain the cube in the socket. As described more fully in U.S. Pat. No. 3,407,717, issued on Oct. 29, 1968 in the name of P. J. Ernisse, these latching fingers further may be provided with cam or tapered end surfaces for downwardly biasing the cube.

For a purpose to be described more fully hereinafter in connection with FIG. 4, the socket post 110 includes means defining cutout sections or slots 120 passing entirely through the post to a hollow post interior or bore (not shown). This interior is adapted to slidably receive a cube-sensing member or T-bar 121 having a body portion 122 and an upper end or portion 124 having cube engageable blades or flanges 126. In an assembled condition, blades 126 extend from the post interior through slots 120 and into the socket interior where they will be engaged by the cube channel member 54 when the cube is positioned in the socket. Normally, the T-bar 122 is resiliently biased to a first or raised position and is cammed or pushed downwardly to a second and lowered or retracted position upon positioning of a cube in the socket to set or adjust certain camera mechanisms as will be described more fully hereinafter in connection with such mechanisms.

The external surfaces 106 of the socket are provided on a lower or base portion thereof with abutment or other indexing means 130 adapted to cooperate with a cube-indexing mechanism described more fully in commonly assigned, copending U.S. application Ser. No. , entitled Firing Mechanism For Percussively Ignitable Flashlamps, filed concurrently herewith in the name of E. L. Sturm.

SENSING AND FIRING MECHANISM

Referring now more particularly to the details of the present invention, and to FIGS. 4 and 5, a preferred embodiment of the flashlamp sensing and firing mechanism 22 is illustrated generally comprising cube-sensing means illustrated as member or T-bar 121, latching and setting element or lever 132, cube-sensing or actuating means including a pivotal arm or member 134, indicating means such as signal or flag 136, a force-transmitting member or striking lever 138, and a driving or impacting member or lever 140.

The cube-sensing means or T-bar 122 was described briefly hereinabove in connection with the socket. Further, however, the T-bar includes a second end or lower portion 142 adapted to be slidably mounted in the camera for movement between a first raised or extended position (represented by dotted lines in FIG. 4) and a second lowered or retracted position (illustrated in solid lines in FIG. 4). The T-bar normally is biased or resiliently urged and maintained in the raised position by engagement with the latching or setting element 132, but is engaged and moved to its retracted position when a flashcube is positioned on the camera.

The latching and setting element 132 is pivotally mounted on the camera, for example, on a mechanism plate or camera-casing not shown, by means of a stud 144 received through an opening in a central portion 148 of the latching or setting element. On one end the element 132 is provided with an abutment or surface 150 for engaging the T-bar lower end portion, while the other end, opposite pivot 144 from the one end, includes a bent end or latching abutment 150 and an exposure control stop or setting member 160. When no cube is positioned on the camera, the element 132 normally is biased by resilient or spring means 162 to a first clockwise (FIG. 4) position wherein the first end portion 150 maintains the T-bar 122 in the first or raised position. However, when a cube is positioned and latched on the camera, the T-bar is forced to its second or retracted position against the bias of spring 162 and thereby rotates element 132 in a counterclockwise direction to its second position.

The sensing or actuating arm 134 is movably mounted within the camera by suitable means, such as a pin 162, supporting one end 164 of the arm for pivotal movement between a first retracted or lowered position "$a'$," in which the arm preferably is completely enclosed within the camera-casing, and extended or raised positions "$b'$" and "$c'$," in which an engaging and actuating extension 166 of the arm is adapted to extend into a cube on the camera for sensing the position of the cube striker. The extension 166 comprises a leg portion 168 bent upwardly from and at right angles to the main body of the arm and is of dimensions to permit noninterfering passage of the leg portion into an opening 82 in the cube base when the arm is moved or pivoted to its raised position. At the upper end of leg portion 166, an abutment or surface 170, and a tapered or inclined camming surface 172, are provided respectively for engaging the cube striker wire and for engaging a portion of the cube base to cam the arm downwardly upon cube rotation as described more fully hereinafter.

Also extending from the body portion of arm 134 are latching and signal-controlling abutment legs or members 176 and 178, respectively, and a pin or contact surface 180. The latching leg is configured and positioned to be engaged by the abutment surface 150 of latching and setting element 132 when no flashlamp is positioned on the camera and the element therefore is in its most clockwise position. Such engagement latches the arm 134 in its lowered position by blocking or interfering with movement of the arm to its raised position. When a flashlamp is positioned on the camera, latching and setting element 132 is rotated counterclockwise by T-bar 122, as described above, and releases the arm to permit movement thereof to its raised positions. The signal-controlling leg couples the arm to signal or flag 136 to transfer movement of the arm to the flag as will be described more fully hereinafter in connection with the signal means. Pin 180 similarly couples the arm to the striking lever 138, for transferring or translating an impacting or striking force to the arm as also will be described more fully hereinafter in connection with lever 138.

Signal or indicating means 136 is illustrated as a translucent flag member 182 mounted for movement between a first retracted or raised position (FIG. 4), wherein it is not ordinarily visible to the camera operator, and a second extended or lowered position (dotted lines in FIG. 1), wherein it may easily be viewed by the operator. Other forms of indicating means not shown could include a warning lamp or body release blocking member setable or movable to conditions or positions representative or indicative of an inoperative flashlamp. It should be understood, however, that even in the case of an electrical signal or lamp, the sensing means, for effecting the signal, is mechanical in operation and is neutral in electrical polarity insofar as its sensing function is concerned.

Preferably, indicating means or flag 182 is pivotally mounted within the camera-casing by a support or rod 184 and is biased or urged toward its raised or retracted position by resilient spring means 186. However, the flag is coupled to or engageable by the leg 178 of the sensing and actuating arm through an appropriate linkage 188 for movement of the flag to its lowered or signal position in response to movement of the arm 134 to an extended position. As illustrated, the flag effects a signal or warning indicative of an inoperative flashlamp, but, of course, it also could be used to signal an operative flashlamp, and in such case would be biased to its lowered position and would be moved to the raised position by movement of the arm 134.

The force-transmitting lever or striking arm 138 is mounted for movement within the camera-casing by suitable means such as pivotal mounting means or stud 190 at a central or body portion of the lever and includes, on one side of the pivot point, a leg or arm 192 coupled to or engageable with the force-transmitting lug 180 on the sensing or actuating arm 134. On the other side of the pivot point the arm includes a beveled camming or striking surface 194 adapted to be struck or impacted by a portion of the striking member or shutter driver 140 as will be described more fully hereinafter. Also on the same end of the striking arm as cam 194 is an attachment surface 195 for a resilient means or spring 196 normally biasing and resiliently urging the striking lever in a counterclockwise direction as viewed in FIG. 5. This resilient force is transmitted by the actuating lever to the sensing or actuating arm 134 and also serves to resiliently urge the arm 134 toward the raised position of the arm as described hereinabove. However, the spring 196 is not sufficiently strong to overcome the latching force of spring 162, which maintains the actuating arm in its lowered position when no cube is positioned on the camera. The surface 194 is adapted to move between any selected one of three positions "a," "b,38 and "c" depending on whether a cube is positioned on the camera and on the operative or inoperative condition of the forwardly facing flashlamp in the cube. For example, when no cube has been positioned on the camera, the striking lever or member 138 will be held in its most clockwise position "a" by the latched sensing or actuating arm 134. In this limit position "a" the surface 194 (dotted lines in FIG. 4) is above a hammer 198 on the striking member or shutter driver 140 and will not be engaged by such hammer when the shutter driver is actuated to effect operation of the camera shutter. If a cube is positioned on the camera, and the forwardly facing flashlamp is operative, the lever 138 will move to a second position "b" wherein surface 194 is located in a position where it will be engaged or impacted by the hammer 198 upon camera operation. Should a cube be positioned in the camera with an inoperative flashlamp in the forwardly facing or firing position, the striking lever or member 138 will move to its third position "c" and the surface 194 will be located below hammer 198 where it again will not be engaged by the hammer upon camera operation.

In the illustrated embodiment, the striking member or shutter driver 140 comprises a two-part arm mounted within the camera for movement between a first or cocked position and a second or released position. While the driver has been illustrated as a two-part construction, these parts move substantially in union and it will be apparent to those skilled in the art that a single-part driver also would be satisfactory. The driver includes a stop or latching surface 202, adapted to be engaged by surface 63 of the camera body release to maintain the driver in a cocked position, and is released by depression of the body release for rapid movement under the influence of a relatively strong spring 200 to a released position of the driver. The driver 140 further is provided with a shutter-driving surface 204 adapted to engage the upper portion of the shutter blade to open the shutter, and a hammer or driving member 198 for striking or impacting the striker lever 138 when this member is in its second position as set forth above.

OPERATION OF SENSING AND FIRING MECHANISM

In the operation of firing mechanism 22, spring 162 and latching element 150 maintain the mechanism in an inoperative or inactive condition prior to positioning of a flashlamp on the camera. In this condition the latching element engages T-bar 122 and sensing and actuating arm 134 to position the bar in a raised location within socket 100 (dotted lines in FIG. 4) and to hold or latch the arm in a lowered position "a'" substantially completely with the camera casing. The arm 134, in turn, engages and secures the flag 182 in its raised position and the striker lever in its first position "a." Thus, *upon depression of the camera body release to effect film exposure, the shutter driver 140 will be released to strike or impact and open the shutter for a proper exposure period. The striker lever 138, on the other hand, will not be engaged by hammer 198 of the driver and the flash-firing mechanism therefore will remain inactive.*

Upon the positioning of a flashlamp on the camera the lamp will engage and cam T-bar 122 to the lowered position thereof (solid lines in FIG. 4) to rotate latching element 132 counterclockwise and release sensing or actuating arm 134. in the released condition, the arm will be raised or moved upwardly under the action of spring member 196, transmitted to the arm through the striker lever 138, until the arm engages and is stopped or blocked by a striker wire associated the forwardly facing lamp (position b' in FIG. 4). For this purpose spring member 196 is of sufficient resiliency to move the mechanical elements as described above, but does not transmit sufficient force to dislodge the striker wire or fire the flashlamp. As the arm 134 moves upwardly, the striking lever 138 will move in response thereto in a clockwise direction as viewed in FIG. 5 to locate the striking surface or cam 194 at position "b" where it will be engaged and impacted by the hammer 198 of the shutter driver. While the signal means or flag 182 also will move or pivot in response to movement of arm 134, this movement will not be sufficient to position the flag in view within the finder. In this case, depression of the body release will release the shutter driver for rapid movement into engagement with shutter blade as described above. Additionally however, and synchronously therewith, the hammer 198 will strike or impact the striker lever 138 to effect firing of the flashlamp. Such firing is accomplished by the transmission or translation of the striking force through the striking lever and to the sensing or actuating arm 134 thereby to rapidly move the arm upwardly and dislodge the preenergized striker wire from its stop member.

Assuming now that the forwardly facing flashlamp is inoperative, its striker wire will not be located in its energized position over cube opening 82 and the sensing or actuating arm 134 will not be blocked or stopped by engagement with the striker wire. Instead the arm will be moved to its most extended position "c'" beyond where it would have contacted the wire. This overextending movement, in turn, will be transmitted through the signal linkage and will affect positioning of the flag 182 in the viewfinder to warn the camera operator that the forwardly facing flashlamp is inoperative. Additionally, the striking lever 138 will move to its third position "c" where the striking cam 194 thereof will be located below the striking element 183 of member 109 and therefore will not be impacted should the shutter inadvertently be operated.

After firing of the flashlamp, the lamp or unit in which it is contained may be rotated to index or position the next lamp in the firing locus. To permit such indexing, the sensing or actuating arm temporarily is cammed downwardly out of the unit until the next flashlamp is properly positioned at the firing locus; at which time the arm again moves upwardly into the unit to contact the striker wire associated with the next lamp. Referring to FIG. 5, and the preferred embodiment, retraction or withdrawal of the sensing arm to permit indexing of flashlamps in a multilamp unit or cube is accomplished by means of cooperative engagement between the beveled or camming surface 172 and peripheral or end portion 210 of opening 82 in the cube base. As the cube rotates, such peripheral or end portion 210 contacts the cam surface 172 (dotted lines in FIG. 5) and translates the rotating force of the cube to a downward or retracting force in the arm. Upon continued rotation of the cube, the arm will ride over the bottom of the cube base until it is aligned with and enters the next adjacent cube opening.

In order to prevent any undesirable tilting of the cube either during firing or indexing thereof, a top surface 212 (FIG. 1) of camera-casing 10 may be provided with a raised abutment or rib 214 substantially opposite the socket from engaging end 170 of the sensing and actuating arm 134. This rib 214 is configured to extend upwardly to a position adjacent the lower surface of cube base 44 when a cube is in the socket and will engage the base to prevent any such undesirable tilting.

EXPOSURE CONTROL MECHANISM

Referring now to FIG. 6 a mechanism for adjusting or setting a camera diaphragm aperture, upon positioning of a flashlamp or cube on the camera, is illustrated. This mechanism includes a portion 220 coupled to the body release 24, a slip clutch 222, adjustable aperture or diaphragm means 224 coupled to the body release portion 220 by the slip clutch 222, a distance setting member 226 and an adjustable linkage 228. Adjustable aperture means 224 is movably or pivotally mounted within the camera for movement between a plurality of positions each respectively effecting the definition of a particular aperture for film exposure. As the camera body release is depressed, an appropriate linkage, such as rack and gear 230, translates the release movement to a rotary movement carried through clutch 222 to the aperture means or diaphragm 224. Final positioning of the diaphragm is determined by a blocking means adjustable to engage and prevent further rotation of the diaphragm only after the diaphragm rotation has positioned the proper aperture behind the objective. In the case of daylight exposure, a blocking means (not shown) may be adjusted in accordance with natural-light intensity. In the case of flash exposure, however, the blocking means comprises a projection 234 on the diaphragm engageable with a blocking lever 236 when the blocking lever is in one of two positions dependent on whether a flashlamp is on the camera and on the camera distance setting. For example, and as will be apparent from the foregoing description of the flash-sensing and actuating mechanism 22, when no flash is positioned on the camera, setting member 160 on the latching and setting lever 132 will be in a lowered position, illustrated in dotted lines in FIG. 6, and will engage linkage 228 to maintain blocking lever 236 in a retracted or inoperative position wherein the daylight exposure system will control the aperture.

When a cube is positioned on the camera, on the other hand, setting member 160 will be moved to its solid line or raised position in FIG. 6 and will not engage linkage 228. Thus, the blocking lever will be free, under certain conditions, to move to its blocking position and override the daylight exposure control system. However, for "normal" flash, the proper aperture usually is the largest aperture available, and under flash conditions this aperture automatically is set by the daylight exposure system. Therefore, a second setting means 242 is provided on the camera setting member 226 to prevent movement of blocking lever 236 to its blocking position when the setting member is set for normal flash (∞ in FIG. 6). For closeup flash, usually 6 feet or less, the second setting means 242 is rotated to nonengaging position (6 ft. in FIG. 6) wherein it will not block movement of blocking lever 236 and, in this case, the blocking lever will engage projection 234 to override the daylight exposure system and to position a smaller aperture behind the objective for proper closeup flash exposure.

It should now be apparent that a simple yet reliable and improved mechanism has been disclosed for effecting the percussive ignition of a photoflashlamp in a multilamp unit or cube, and for successively sensing the operative or inoperative condition of each lamp upon successive or selective rotation of the lamps to the firing locus or forwardly facing position. The improved mechanism is maintained within the camera body when no flash is on the camera, thereby to protect the mechanism, and automatically is moved into engagement with the flashlamp impacting member or striker wire both when a lamp or flashcube first is positioned on the camera, and thereafter when successive lamps are indexed to the firing position. Such engagement permits continuous sensing of the flashlamp condition whenever and as long as a lamp is in the firing position and further permits more accurate striking or actuation of the flashlamp-impacting member. Moreover, even though the sensing member is in continuous contact with any operative striker wire in the firing position, it does not substantially interfere with indexing of flashlamps in the cube. Still further the mechanism is particularly adapted to cooperate with and control a flash-exposure control system which adjusts the camera diaphragm for proper flash exposure in response to the positioning of a flashlamp on the camera.

While the preferred mechanism has been described in connection with a camera, it should be understood that it could be incorporated into, and would operate equally well, in other photographic apparatus such as camera attachments or separate flash-firing apparatus. Moreover, many different aspects and important features of the invention have been set forth in a preferred combination. However, one or more of these features can be used alone or in other combinations as will be apparent to those skilled in the art and from the above description and accompanying drawings.

The invention has been described in detail with particular reference to a preferred embodiment thereof, but it will be understood that variations and modifications can be effected within the spirit and scope of the invention.

We claim:

1. Photographic apparatus for use with a mechanically fireable flashlamp positionable on the apparatus; the flashlamp having a striker in a preenergized conditions from which the striker is releasable to percussively fire the flashlamp; the apparatus comprising:
  a casing;
  an actuating member mounted on the casing for movement between a retracted position, wherein the member is substantially protected by the casing, and an extended position, wherein the member protrudes through the casing for engaging the flashlamp striker;
  means for urging said actuating member towards its extended position, said means exerting a force sufficient to move said member into engagement with the striker but insufficient to release the striker;
  blocking means for maintaining the member in its retracted position prior to positioning of the flashlamp on the apparatus; and,
  mans for disengaging said blocking means in response to positioning of the flashlamp on the camera to release and effect movement of said member to its extended position of nonreleasing engagement with the flashlamp striker.

2. Photographic apparatus as claimed in claim 1, and further comprising:
  a driver member for imparting a force to said actuating member when the member is in its extended position, to release the flashlamp striker and fire the flashlamp.

3. A photographic camera for use with a flashlamp positionable on the camera; the flashlamp having a striker wire lodged in a preenergized position spaced from the flashlamp, the striker wire being dislodgeable from its preenergized position to strike and percussively fire the flashlamp; the camera comprising:
  a housing;
  a firing member including an abutment element for engaging and dislodging the striker wire to fire the flashlamp, said member being mounted on the housing for movement between a retracted position wherein the abutment element is substantially enclosed by the housing, and first and second extended positions, respectively, wherein the abutment element is displaced from the housing first for engaging the flashlamp striker wire without dislodging the wire and second for dislodging the striker wire to fire the flashlamp;
  control means on the housing for maintaining the firing member in the retracted position thereof when the flashlamp is not positioned on the camera, and for moving the member to the first extended and abutment engaging position in response to positioning of the flashlamp on the camera; and,
  driving means engageable with said firing member for effecting movement of said member to the second extended position thereof for dislodging the striker and firing the flashlamp.

4. A camera as claimed in claim 3, wherein the flashlamp is supported in a unit containing a plurality of such flashlamps, and striker wires indexable on the camera to position respective ones of the flashlamps at a firing locus; and wherein the firing member further has a withdrawn position with the abutment element spaced from the preenergized positions of the striker wires; said firing member being movable first to its withdrawn position to permit indexing of the flashlamps and then to its first extended and abutment engaging position, both in response to indexing of the flashlamps.

5. A camera as claimed in claim 4, wherein the flashlamps and striker wires are indexable by rotating the unit relative to the camera, and wherein the firing member includes cam means cooperative with the unit to cam the member to its withdrawn position in response to rotation of the unit.

6. A camera mechanism for mechanically sensing the operative or inoperative condition of a flash device positionable on the camera at a firing locus; the flash device including a percussively fireable flashlamp and a firing striker having an energized position spaced from the lamp and from which the firing striker is movable to a released position in engagement with the lamp to fire the lamp, the mechanism comprising:

indicating means having a first condition representative of the firing striker in the energized position and a second condition representative of the firing striker in the released position;

a mechanical sensing member resiliently urged toward an extended position and movable toward said position in response to positioning of a flash device at the firing locus, said member being engageable by the firing striker to block the member from movement to the extended position only when the striker is in the energized position, the member moving to its extended position when the striker is in its released condition; and, means coupling said sensing member and said indicating means for setting said indicating means to its second condition whenever said sensing member is in its extended condition.

7. A camera as claimed in claim 6 wherein said coupling means is a mechanical linkage.

8. Photographic apparatus for use with a multilamp flash unit positionable on the apparatus and containing a plurality of percussively fireable flashlamps each having a preenergized striker releasable to fire its respective lamp, the apparatus comprising:

means for receiving the multilamp unit on the apparatus and for indexing the unit to locate respective ones of the flashlamps at a predetermined firing position;

an actuating member movable into the multilamp unit to engage the respective striker of a flashlamp at the firing position and to fire such flashlamp; and, means for withdrawing the actuating member from the unit and for returning the actuating member into the unit in response to indexing of the unit.

9. A photographic apparatus as claimed in claim 8, wherein said withdrawing means includes a cam for effecting the withdrawal of the member from and return of the member into the unit.

10. Photographic apparatus as claimed in claim 9, wherein said cam is defined by said actuating member and is adapted to engage and cooperate with the multilamp unit upon indexing thereof to effect withdrawal of the member.

11. Photographic apparatus for detachably receiving and for firing respective ones of a plurality of flashlamps contained in a multilamp unit; the flashlamps each having a preenergized striker releasable to percussively fire its respective flashlamp, and the unit having a base defining an opening for each striker through which the strikers are engageable for releasing; the apparatus comprising:

an actuating member mounted on the apparatus for movement between a first position wherein the member will be withdrawn from the base of a unit received on the apparatus, and a second position wherein the member will extend through one of the openings in the base;

means for indexing respective ones of the flashlamps to a firing location;

means for moving said actuating member to the second position thereof, when a selected one of the flashlamps has been indexed to the firing position, thereby positioning said actuating member for engaging the striker of a respective flashlamp at the firing location; and means for moving said actuating member to its first position and back to its second position through another of said openings in response to indexing of the flashlamps to permit such indexing without substantial interference from the actuating member.

12. In photographic apparatus, a mechanical firing member for firing respective ones of a plurality of percussively ignitable flashlamps in a multilamp unit removably positionable on the apparatus, each flashlamp having a striker lodged at a preenergized position and being indexable on the apparatus to position respective ones of the flashlamps at a firing locus, the firing member comprising:

an actuating arm mounted on the apparatus for pivotal movement of one end of the arm between a retraced position, wherein the one end will be spaced from the preenergized striker of a flashlamp at the firing locus, and extended positions for engaging and dislodging the striker of a flashlamp at the firing locus to fire such flashlamp;

means resiliently urging the arm toward its extended positions when a unit is positioned on the apparatus; and, means defining a camming surface on the arm and engageable with the multilamp unit to move the arm to its retracted position in response to indexing of the flashlamps.

13. In photographic apparatus, a mechanical firing mechanism for individually firing a plurality of percussively fireable flash devices; the devices each being supported on a base portion indexably receivable on the apparatus to position respective ones of the devices at a firing locus; each device having a flashlamp and an energized striker releasable to fire the flashlamp; the mechanism comprising:

an actuating arm mounted on the apparatus for pivotal movement of one end of the arm between first and second extended positions and a retracted position, respectively for nonreleasably engaging a preenergized striker of a flash device at the firing locus, for releasing such engaged striker and firing its respective flashlamp, and for withdrawing the arm from the flash devices to permit indexing of the flash devices;

means resiliently urging the arm toward its extended positions when a flash device is positioned at the firing locus; and means defining camming surfaces on said arm, said surfaces being adapted to cooperate with the base portion of the flash devices to cam the arm to its retracted position in response to indexing of the flash devices.

14. In photographic apparatus, a mechanical firing mechanism for individually firing a plurality of percussively fireable flash devices; the devices each being supported on a base portion indexably receivable on the apparatus to position respective ones of the devices at a firing locus; each device having a flashlamp and an energized striker releasable to fire the flashlamp; the mechanism comprising:

an actuating arm mounted on the apparatus for pivotal movement of one end of the arm between first and second extended positions and a retracted position, respectively for nonreleasably engaging a preenergized striker of a flash device at the firing locus, for releasing such engaged striker and firing its respective flashlamp, and for withdrawing the arm from the flash devices to permit indexing of the flash devices;

means resiliently urging the arm toward its extended positions and for moving said arm toward said positions in response to positioning of a flash device at the firing locus, said arm being blocked by the striker and moving only to its first extended position when the striker is energized, said arm moving to its second extended position when the striker is released, thereby to sense the presence of an inoperative striker at the firing locus; and, means responsive to movement of the arm to its second extended position for effecting a warning signal indicative of an inoperative flashlamp.

15. Photographic apparatus for use with flash units of the type having at least one flashlamp fireable by striking and each such lamp having an individual striker movable between energized and deenergized positions, said apparatus comprising:

means for detachably receiving such a flash unit with the energized position of a striker thereof located at a predetermined position;

sensing means movable to said predetermined position for sensing the presence or absence of a striker at said predetermined position; and means for moving said sensing means to said predetermined position in response to receipt of a flash unit in said receiving means.

16. Photographic apparatus for use with flash units of the type having at least one flashlamp fireable by striking and each such lamp having an individual striker movable between energized and deenergized positions, said apparatus comprising:

means for detachably receiving such a flash unit with the energized position of a striker thereof located at a predetermined position;

sensing means movable to said predetermined position for sensing the presence or absence of a striker at said predetermined position; and means for moving said sensing means to said predetermined position in response to receipt of a flash unit in said receiving means;

a controllable photographic component; and means responsive to sensing the presence or absence of a striker in said predetermined position for controlling said component accordingly.

17. Photographic apparatus for use with flash units of the type having at least one flashlamp fireable by striking and each such lamp having an individual striker movable between energized and deenergized positions, said apparatus comprising:

means for detachably receiving such a flash unit with the energized position of a striker thereof located at a predetermined position;

sensing means movable to said predetermined position for sensing the presence or absence of a striker at said predetermined position;

means for moving said sensing means to said predetermined position in response to receipt of a flash unit in said receiving means;

signalling means; and means responsive to said sensing means for controlling said signalling means according to the presence or absence of a striker in said predetermined position.

18. Photographic apparatus for use with photoflash units, which units have at least one flashlamp fireable by striking and one releasable, energized striking element for each such lamp, said apparatus comprising:

means for detachably receiving such a photoflash unit with an energized striker thereof in a predetermined position;

a casing;

an actuating member mounted for movement between a retracted position, wherein the member is substantially protected by the casing, and an extended position wherein the member protrudes through the casing to said predetermined position for engaging an energized striker;

means for urging said actuating member toward its extended position with enough force to move said member into engagement with a striker at said predetermined position but with insufficient force to release the striker;

blocking means for maintaining the member in its retracted position prior to positioning of a flashlamp unit on the apparatus; and means for disengaging said blocking means in response to receipt of a flashlamp unit in said receiving means to release and effect movement of said actuating member to its extended position.

19. Photographic apparatus for use with photoflash units, which units have at least one flashlamp fireable by striking and one releasable, energized striking element for each such lamp, said apparatus comprising:

means for detachably receiving such a photoflash unit with an energized striker thereof in a predetermined position;

a casing;

an actuating member mounted for movement between a retracted position, wherein the member is substantially protected by the casing, and an extended position wherein the member protrudes through the casing to said predetermined position for engaging an energized striker;

means for urging said actuating member toward its extended position with enough force to move said member into engagement with a striker at said predetermined position but with insufficient force to release the striker;

blocking means for maintaining the member in its retracted position prior to positioning of a flashlamp unit on the apparatus;

means for disengaging said blocking means in response to receipt of a flashlamp unit in said receiving means to release and effect movement of said actuating member to its extended position; and means for imparting an additional force to said actuating member when the member is in its extended position, to release the flashlamp striker and fire the flashlamp.

20. Photographic apparatus for use with flash units of the type having at least one flashlamp fireable by striking and each such lamp having an individual striker movable between energized and deenergized positions, said apparatus comprising:

means for detachably receiving such a flash unit with the energized position of a striker thereof located at a predetermined position;

sensing means movable to said predetermined position for sensing the presence or absence of a striker at said predetermined position;

means for moving said sensing means to said predetermined position in response to receipt of a flash unit in said receiving means;

signalling means;

means responsive to said sensing means for controlling said signalling means according to the presence or absence of a striker in said predetermined position;

means for actuating a shutter to effect a picture-taking operation; and means for imparting a force to said actuating member to release the flashlamp striker in timed relation to said shutter actuation.

21. Photographic apparatus for use with photoflash units, which units having at least one flashlamp fireable by striking and one releasable, energized striking element for each such lamp, said apparatus comprising:

means for detachably receiving such a photoflash unit with an energized striker thereof in a predetermined position;

a sensing member movable along a path from a first position to a third position through a second position, which path is blockable by an energized striker in said predetermined position;

means for applying a force to said sensing member, which force is sufficient to move said sensing member from said first position to its third position if there is no energized striker blocking said path, but insufficient to move said member past its second position if an energized striker is blocking said path, thereby sensing the presence or absence of a striker at said predetermined position;

means for preventing said force-applying means from moving said sensing member from its first position; and means responsive to the receipt of a photoflash unit in said receiving means for disabling said preventing means, thereby permitting said sensing member to move from its first toward its third position.

22. Photographic apparatus for use with a multilamp flash unit containing a plurality of flashlamps fireable by striking and an individual striker for each such lamp movable between a preenergized position and a striking position for firing its lamp, said apparatus comprising:

means for indexably receiving such a flash unit;

means for indexing a received unit to sequentially place the flashlamps thereof at a firing location;

means movable into a received unit for engaging the striker of a flashlamp at the firing location for releasing the striker to fire its respective flashlamp; and means for withdrawing said engaging means from the unit and for returning the engaging means into the unit both in response to indexing of the unit.

23. Photographic apparatus for use with a multilamp flash unit containing a plurality of flashlamps fireable by striking and an individual striker for each such lamp movable between a preenergized position and a striking position for firing its lamp, said apparatus comprising:

means for indexably receiving such a flash unit;

means for indexing a received unit to sequentially place the flashlamps thereof at a firing location;

means movable into a received unit for engaging the striker of a flashlamp at the firing location for releasing the striker to fire its respective flashlamp; and means engageable with a received flash unit and driveable by such a unit for withdrawing said engaging means from said unit during indexing of the unit.

24. Photographic apparatus for use with photoflash units, which units have a plurality of flashlamps fireable by striking, one releasable energized striking element for each such lamp, and a base having an opening for each striking element through which such striking element can be engaged, said apparatus comprising:

means for detachably receiving such a photoflash unit with an energized striker thereof in a predetermined position;

a sensing member movable along a path from a first position into an access opening and through said predetermined position to a second position;

means for applying a force to said sensing member, which force is sufficient to move said sensing member to its second position if there is no energized striker at said predetermined position but insufficient to move said member past the predetermined position if an energized striker is located thereat, thereby sensing the presence or absence of a striker at said predetermined position;

a cam surface on the end of said sensing member cooperable with the base of a received unit for camming said sensing member out of said access opening toward said first position during indexing of said unit; and means for indexing said unit to sequentially place the flashlamps of a received unit with their respective energized strikers at said predetermined position.

25. Photographic apparatus for use with photoflash units, which units having a plurality of flash lamps fireable by striking, one releasable energized striking element for each such lamp, and a base having an opening for each striking element through which such striking element can be engaged for releasing, said apparatus comprising:

means for detachably receiving such a photoflash unit with an energized striker thereof in a predetermined position;

a sensing member movable along a path from a first position into an access opening and through said predetermined position to a second position;

means for applying a force to said sensing member, which force is sufficient to move said sensing member to its second position if there is no energized striker at said predetermined position but insufficient to move said member past the predetermined position if an energized striker is located thereat, thereby sensing the presence or absence of a striker at said predetermined position;

a cam surface on the end of said sensing member cooperable with the base of a received unit for camming said sensing member out of said access opening toward said first position during indexing of said unit;

means for indexing said unit to sequentially place the flashlamps of a received unit with their respective energized strikers at said predetermined position;

means for holding said sensing member in its retracted position against the urging of said force-applying means; and means for disabling said holding means in response to receipt of a photoflash unit in said receiving means.

26. The invention according to claim 25, wherein said apparatus further includes a controllable component and means for controlling said component in response to movement of said sensing member to its second position.

27. The invention according to claim 26, wherein said controllable component is a signalling means indicating that there is no energized striker at said predetermined position in response to movement of said sensing member to its second position.

* * * * *